United States Patent [19]
Mark et al.

[11] Patent Number: 6,130,755
[45] Date of Patent: Oct. 10, 2000

[54] FIBER-OPTIC GYRO UTILIZING PSEUDORANDOM-BIT-SEQUENCE LIGHT MODULATION

[75] Inventors: John G. Mark, Pasadena; Daniel A. Tazartes, West Hills; David I. Tazartes, Beverly Hills; Daniel P. Wiener, Simi Valley, all of Calif.

[73] Assignee: Litton Systems Inc., Woodland Hills, Calif.

[21] Appl. No.: 09/255,377

[22] Filed: Feb. 22, 1999

[51] Int. Cl.$^7$ .................................................... G01C 19/72
[52] U.S. Cl. .............................................................. 356/464
[58] Field of Search .............................................. 356/350

[56] References Cited

U.S. PATENT DOCUMENTS 5,020,912   6/1991   Pavlath ..................................... 356/350
5,682,241  10/1997   Mark et al. ............................... 356/350

Primary Examiner—Samuel A. Turner
Attorney, Agent, or Firm—Robert E. Malm

[57] ABSTRACT

The invention is a method and apparatus for determining the rotation of a medium through which a light beam propagates by modulating the light beam with a pseudorandom sequence of bits. The method comprises the steps of (1) selecting a "0" or a "1" as the next bit of the modified pseudorandom bit sequence if one or more criteria are satisfied, the criteria being based on the measured properties of a plurality of prior bits of the modified pseudorandom bit sequence; otherwise: (2) selecting the next bit of an initial pseudorandom bit sequence as the next bit of the modified pseudorandom bit sequence, the next bit of the initial pseudorandom bit sequence being a function of one or more prior bits of the initial pseudorandom bit sequence.

15 Claims, 2 Drawing Sheets

FIBER-OPTIC GYRO UTILIZING PSEUDORANDOM-BIT-SEQUENCE LIGHT MODULATION

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to fiber-optic gyroscopes and more specifically to the pseudorandom bit sequence generators that are used in such apparatus.

Fiber-optic gyros measure rate of rotation by determining the phase difference in light waves that propagate in opposite directions through a coil wound with optical fiber. Light waves that propagate through the coil in the direction of rotation take a longer time than light waves that propagate through the coil in the direction opposite to the direction of rotation. This difference in time, measured as the phase difference between counter-propagating light waves, is proportional to the angular velocity of the coil.

A typical block diagram for a fiber-optic gyro is shown in FIG. 1. A light source 2 supplies a reasonably coherent light beam to the optical-fiber interferometer 4 which causes the input light beam to be split into two light beams that are fed into opposite ends of an optical fiber 51 configured as a coil 56. The light beams emerging from opposite ends of the optical fiber are recombined into a single output light beam, which feeds into the detector 6.

In more detail, the light beam $W_i$ from light source 2 passes into port A and out of port C of directional coupler 52 and then into port A and out of ports C and D of directional coupler 54. Thus, two counter-propagating light beams $W_1$ and $W_2$ are established in coil 56. The counter-propagating light beams $W_1$ and $W_2$ are phase-modulated by modulator 58 and then pass into ports C and D of directional coupler 54 where they are combined into a single light beam $W_o$ that exits through port A. The combined light beam $W_o$ passes into port C of directional coupler 52, out of port B, and then into detector 6.

The output of the detector 6 is given by $$I = \frac{I_o}{2}[1 + \cos\theta(t)] \quad (1)$$

where $I_o$ is the peak light intensity and $\theta(t)$ is the phase difference between the two beams expressed as a function of time.

The phase difference $\theta(t)$ typically takes the form $$\theta(t) = [\Phi(t)]_{mod\ 2\pi} - [\Phi(t-\tau)]_{mod\ 2\pi} + \phi_S + 2\pi n \quad (2)$$

where $\Phi(t)$ is the phase-modulation generating function and $\Phi(t)_{mod\ 2\pi}$ is the phase modulation introduced by a phase modulator at one end of the fiber-optic coil in the interferometer 4, $\tau$ is the propagation time through the fiber optic coil, and $(\phi_S + 2\pi n)$ is the so-called Sagnac phase resulting from the rotation of the fiber-optic coil about its axis. The integer n (called the Sagnac fringe number) is either positive or negative and the Sagnac residual phase $\phi_S$ is constrained to the range $-\pi \leq \phi_S < \pi$.

The output of the detector 6 is converted to digital form by the analog-to-digital converter 8 and then processed in the digital processor 10 to yield at the output a measure of the rate and angle of rotation of the interferometer 4. In addition, the digital processor 10 generates a phase-modulation generating function $\Phi(t)$, the modulo-$2\pi$ portion of which is converted to analog form by the digital-to-analog converter 12 and supplied to the phase modulator in the interferometer 4.

The phase-modulation generating function $\Phi(t)$ typically consists of a number of phase-modulation components among which are $\Phi_{SE}(t)$ and $\Phi_M(t)$. The phase-modulation component $\Phi_{SE}(t)$ is typically a stepped waveform with steps that change in height by $-\phi_{SE}$ at $\tau$ intervals where $\phi_{SE}$ is an estimate of $\phi_S$. Thus, the $\Phi_{SE}(t)$ modulation cancels in large part $\phi_S$. The accurate measurement of the uncancelled portion of the Sagnac residual phase $\phi_S$ is of great importance in that it is the quantity that is used in refining the estimate of the Sagnac phase and generating the $\Phi_{SE}(t)$ phase-modulation component.

The accurate measurement of the uncancelled portion of the Sagnac residual phase is greatly facilitated by choosing the $\Phi_M(t)$ phase-modulation component such that $[\Phi_M(t) - \Phi_M(t-\tau)]$ is equal to $j\phi_M$ where the permitted values of j are the values $-1$ and $1$ and $\phi_M$ is a predetermined positive phase angle somewhere in the vicinity $\pi/2$ radians where the slope of the cosine function is greatest. This effect can be achieved, for example, by having $\Phi_M(t)$ be a square wave with amplitude $\pi/2$ and period $2\tau$.

A method of fiber-optic gryo modulation using a pseudorandom bit sequence to control the sign j of the phase modulation quantity $j\phi_M$ was disclosed by Spahlinger in U.S. Pat. No. 5,123,741. This pseudorandom modulation approach improved gyro bias by canceling out cross-coupled electronic errors, which rectify in conventional deterministic modulation schemes. This approach was carried a step further by Mark & Tazartes in an invention disclosed in U.S. Pat. No. 5,682,241 wherein a method of random overmodulation (i.e. $\phi_M$ greater than $\pi/2$) simultaneously reduced bias and random errors (via pseudorandom modulation) and random walk (via overmodulation—see U.S. Pat. No. 5,530,545).

In the early development of pseudorandom modulation it was determined that sequences with short repetition periods were undesirable because of their relatively poor autocorrelation properties. Sequences with sufficient length (typically spanning on the order of 1 second) are used for fiber-optic gyro modulation. However, due to the random walk properties of pseudorandom sequences, it was found that these sequences generated large low-frequency components. These low-frequency components are undesirable because they do not transmit well through AC-coupled circuits, as is usually the case with the optical detector circuitry used in fiber-optic gyros. Further, the low frequencies imply that for extended periods of time the gyro may operate predominantly with one modulation sign. During these periods, the gyro signal may be subject to offset drifts, intensity drifts, or gain drifts.

BRIEF SUMMARY OF THE INVENTION

The invention is a method and apparatus for determining the rotation of a medium through which a light beam propagates by modulating the light beam with a pseudorandom sequence of bits. The method comprises the steps of (1) selecting a "0" or a "1" as the next bit of the modified pseudorandom bit sequence if one or more criteria are satisfied, the criteria being based on the measured properties of a plurality of prior bits of the modified pseudorandom bit sequence; otherwise: (2) selecting the next bit of an initial pseudorandom bit sequence as the next bit of the modified pseudorandom bit sequence, the next bit of the initial pseudorandom bit sequence being a function of one or more prior bits of the initial pseudorandom bit sequence.

DETAILED DESCRIPTION OF THE INVENTION

The present invention is a pseudorandom bit sequence generator that provides reduced low-frequency content while retaining good autocorrelation vis-à-vis prior-art generators of comparable repetition periods. The embodiment 1 shown in FIG. 2 is based on the well-known maximal-length pseudorandom bit sequence generators.

Figure 1:
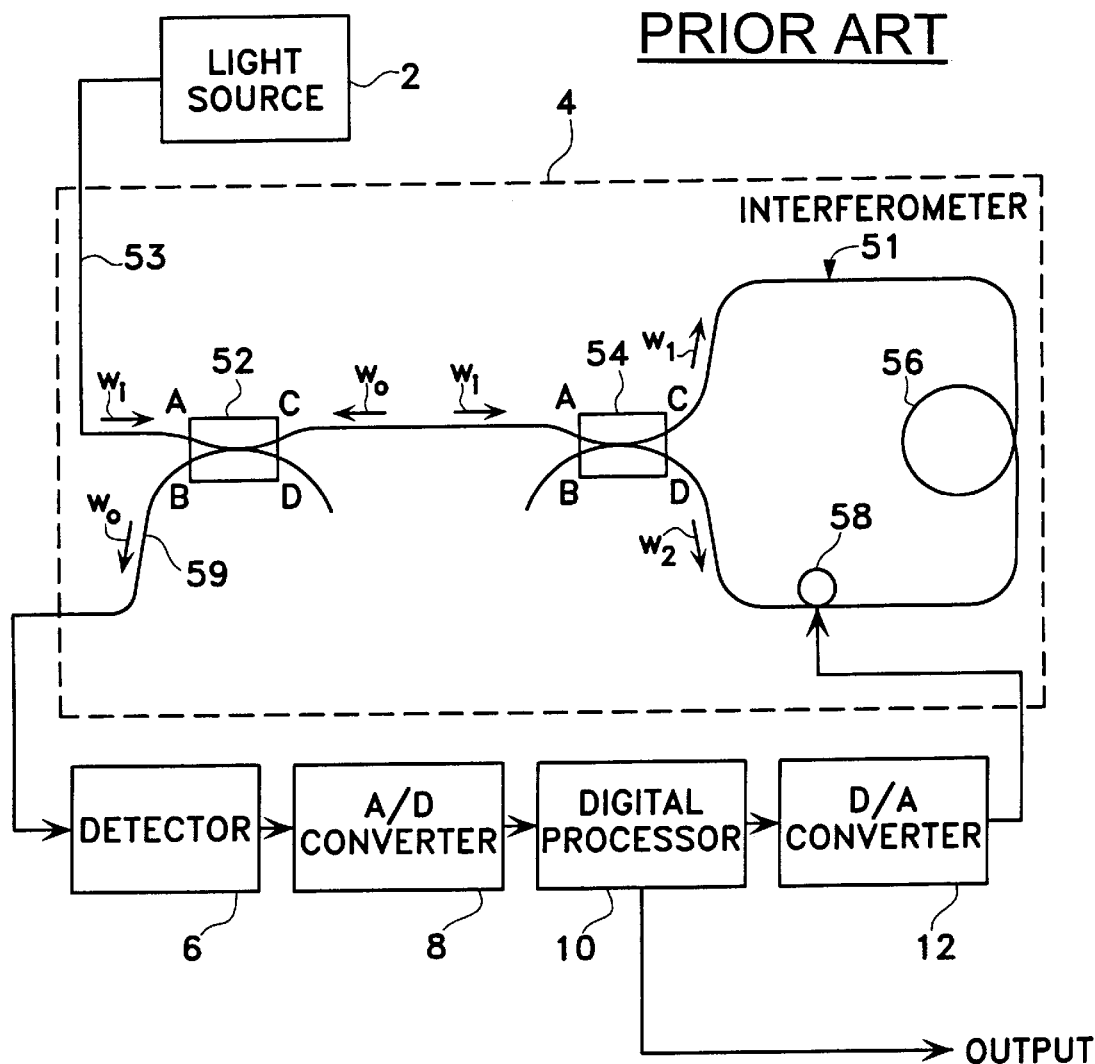
FIG. 1 is a block diagram of a fiber-optic gyro and associated control loop.
Figure 2:
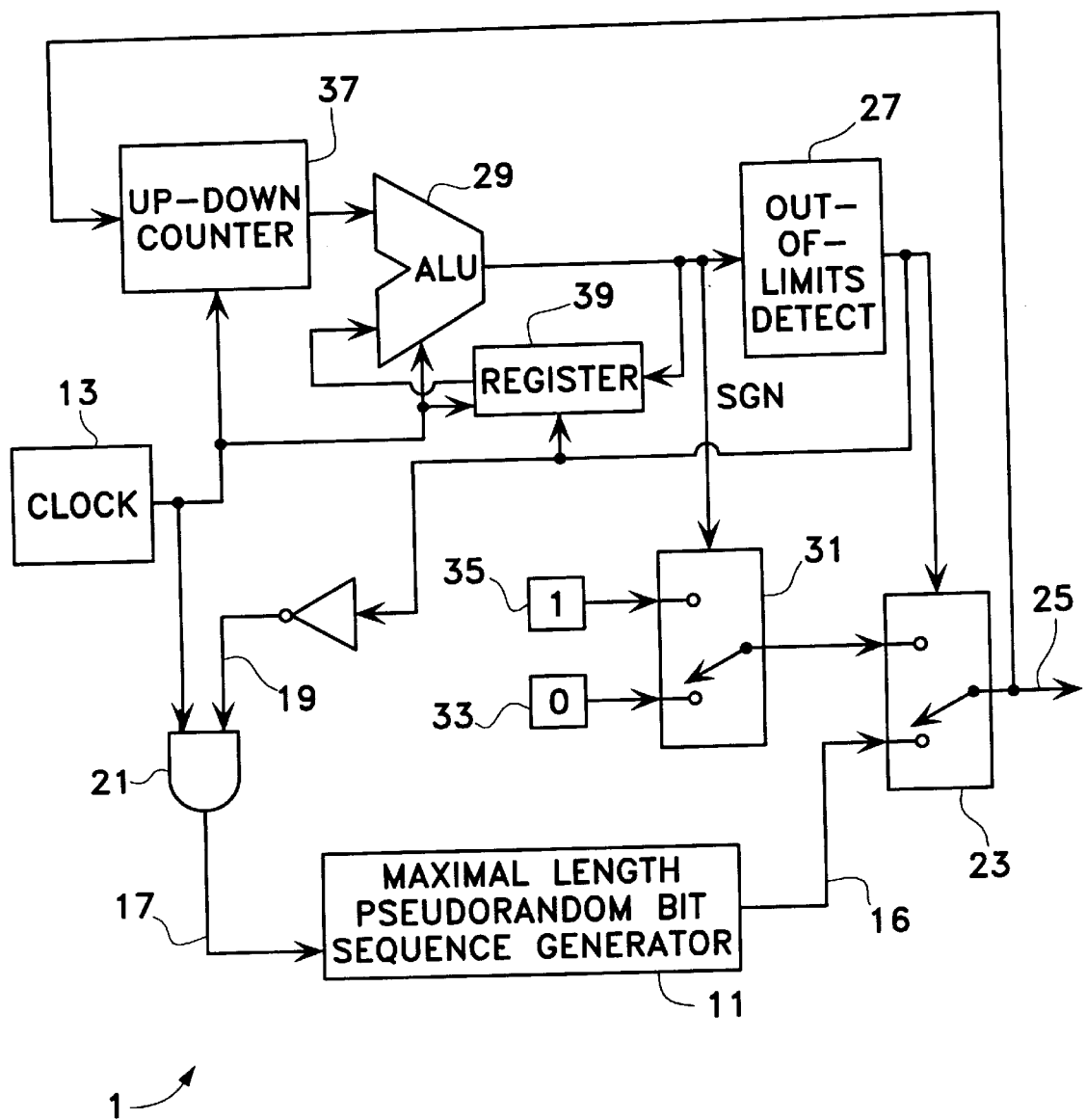
FIG. 2 is a block diagram of an embodiment of the present invention.

The embodiment 1 of the invention shown in FIG. 2 consists of a maximnal-length pseudorandom bit sequence generator 11 driven by a clock signal provided by clock 13. The pseudorandom bit sequence generator 11 produces a pseudorandom bit on the output line 15 for each transition in a predetermined direction of the gated clock signal appearing on the input line 17. Normally, the voltage on the clock control line 19 is high with the result that the clock signal passes through AND gate 21 and a stream of bits from the pseudorandom bit sequence generator 11 passes over output line 15 through switch 23 to the output line 25 of embodiment 1.

Switch 23 and the passage of the clock signal through AND gate 21 are controlled by out-of-limits detector 27. When the output of the ALU (arithmetic logic unit) 29 is greater than some positive limit or less than some negative limit, the out-of-limits detector 27 output goes high, thereby preventing the clock signal from passing through AND gate 21 and causing switch 23 to connect line 25 to switch 31. Switch 31 connects switch 23 to the "0" voltage source 33 if the output of ALU 29 is positive or to the "1" voltage source 35 if the output of ALU 29 is negative.

The up-down counter 37 in combination with ALU 29 and register 39 determine the state of the out-of-limits detector 27 output. A "1" bit on line 25 causes the up-down counter 37 to increase its count by 1 when a clock signal transition in the predetermined direction occurs. A "0" bit on line 25 causes the up-down counter 37 to decrease its count by 1 when the specified clock signal transition occurs.

The count maintained by the up-down counter 37 can range between $-2^N$ to $+2^N-1$ when "1's" are translated into +1's and "0's" are translated into $-1$'s, the parameter N being a design parameter. The up-down counter 37 thus maintains a measure of the arithmetic mean of the bit sequence since the up-down counter 37 was last initialized. A "measure" of the arithmetic mean is either the value of the arithmetic mean or the value of a monotonic function of the arithmetic mean. The quantity monitored by the up-down counter is a monotonic function of the arithmetic mean rather than the arithmetic mean since the count is not divided by the number of samples counted.

With each clock signal transition in the predetermined direction, the ALU 29 adds the prior value produced by the ALU 29 and stored in register 39 to the new value residing in the up-down counter 37. Thus, the ALU-register arrangement is a digital integrator. When the output of the ALU exceeds one of the limits of the out-of-limits detector 27, the out-of-limits detector 27 clears register 39 and the integration by the ALU begins again. The integration time T(n) is the interval between the ends of the (n−1)'th and the n'th integrations. The integration time T(n) typically varies with n. The positive and negative limits of the out-of-limits detector 27 are typically set such that the integration time T(n) extends over many clock signal cycles.

The output ALU(n) at the end of the n'th integration can be interpreted as a smoothed measure of the arithmetic mean of the pseudorandom bit sequence produced by embodiment 1. The operation of embodiment 1 is such that if the smoothed measure of the arithmetic mean of the pseudorandom bit sequence produced by the embodiment exceeds certain specified limits, "0's" or "1's" are introduced into the sequence which will cause the arithmetic mean to be maintained within certain limits. It should be noted that as the mean approaches 0, T(n) can be expected to increase, thereby increasing the smoothing time and decreasing the likelihood of fluctuations in the smoothed mean causing undesirable injections of "0's" or "1's" into the pseudorandom bit sequence.

The combination of the up-down counter 37, the ALU 29, and the register 39 in embodiment 1 is a particularly simple way of obtaining a smoothed measure of the arithmetic mean of the output pseudorandom bit sequence. This invention envisions many other embodiments for accomplishing the same purpose.

The up-down counter 37 could be supplemented with a pseudorandom bit counter. The up-down count divided by the bit count could be used as the measure of the arithmetic mean of the pseudorandom bit sequence. A measure of the arithmetic mean could also be obtained by weighting the individual bits of the pseudorandom bit sequence and summing the results, a process which could be performed, for example, by passing the pseudorandom bit sequence through a digital filter or by multiplying the pseudorandom bit sequence by a weighting sequence and summing the results in an ALU-register combination.

The smoothing operation performed by ALU 29 and register 39 could also be performed in a variety of ways. For example, successive measures of the arithmetic mean could be weighted and summed by passing the measures through a digital filter or by separately multiplying the sequence of measures of the arithmetic mean by a weighting sequence and summing the results in an ALU-register combination.

Although the focus of the present invention is to generate a pseudorandom bit sequence with a near-zero arithmetic mean, it should be recognized that the invention in a more general context allows one to control other properties of a generated pseudorandom bit sequence.

What is claimed is:

1. A method for determining the rotation of a medium through which a light beam propagates by modulating the light beam with a pseudorandom sequence of bits, the method comprising the steps:

(a) selecting a "0" or a "1" as the next bit of a modified pseudorandom bit sequence if one or more criteria are satisfied, the criteria being based on the measured properties of a plurality of prior bits of the modified pseudorandom bit sequence; otherwise:

(b) selecting the next bit of an initial pseudorandom bit sequence as the next bit of the modified pseudorandom bit sequence, the next bit of the initial pseudorandom bit sequence being a function of one or more prior bits of the initial pseudorandom bit sequence;

(c) causing a light beam to propagate through a medium that encircles a predetermined volume of space;

(d) modulating the light beam with the modified pseudorandom bit sequence;

(e) processing the light beam of step (d) to determine the rotation of the medium.

2. An apparatus for determining the rotation of a medium through which a light beam propagates by modulating the light beam with a pseudorandom sequence of bits, the apparatus comprising:

(a) a means for selecting a "0" or a "1" as the next bit of a modified pseudorandom bit sequence if one or more criteria are satisfied, the criteria being based on the measured properties of a plurality of prior bits of the modified pseudorandom bit sequence;

(b) a means for selecting the next bit of an initial pseudorandom bit sequence as the next bit of the modified pseudorandom bit sequence if the one or more criteria are not satisfied, the next bit of the initial pseudorandom bit sequence being a function of one or more prior bits of the initial pseudorandom bit sequence.

3. The apparatus of claim 2 wherein means (a) comprises:

(a1) a means for selecting a "0" as the next bit if one or more "0"-select criteria are satisfied.

4. The apparatus of claim 3 wherein the one or more "0"-select criteria are that the number of prior "1's" exceeds the number of prior "0's" by a specified measure.

5. The apparatus of claim 2 wherein means (a) comprises:

(a2) a means for selecting a "1" as the next bit if one or more "1"-select criteria are satisfied.

6. The apparatus of claim 5 wherein the one or more "1"-select criteria are that the number of prior "0's" exceeds the number of prior "1's" by a specified measure.

7. The apparatus of claim 2 wherein means (a) comprises:

(a1) a means for selecting a "0" as the next bit if one or more "0"-select criteria are satisfied;

(a2) a means for selecting a "1" as the next bit if one or more "1"-select criteria are satisfied.

8. The apparatus of claim 7 wherein means (a) further comprises:

(a0) a means for obtaining a measure of the arithmetic mean of the prior bits of the modified pseudorandom bit sequence, the "0"-select criteria and the "1"-select criteria being based on the measure of the arithmetic mean.

9. The apparatus of claim 8 wherein the "0"-select criteria are that the measure of the arithmetic mean is greater than a first value.

10. The apparatus of claim 8 wherein the "1"-select criteria are that the measure of the arithmetic mean is less than a second value.

11. The apparatus of claim 2 wherein the last bit of the modified pseudorandom bit sequence appears at the output port of the apparatus, the means (a) comprising:

a clock which supplies a clock signal at an output port;

a switch control unit having a clock-signal input port, a pseudorandom-bit input port, a bit-select output port, and a source-select output port, the output port of the clock being connected to the clock-signal input port of the switch control unit, the output port of the apparatus being connected to the pseudorandom-bit input port, the switch control unit generating a bit-select signal and a source-select signal based on a plurality of prior pseudorandom bits generated by the apparatus, a clock-signal transition in a predetermined direction causing the bit-select signal to be in a "0"-select state or a "1"-select state, a clock-signal transition in the predetermined direction causing the source-select signal to be in a bit-select switch state or a bit-generator state, the bit-select signal and the source-select signal being made available at the corresponding output ports of the switch control unit;

a bit-select switch having a "0" input port, a "1" input port, a bit-select input port, and an output port, a voltage associated with a "0" being fed to the "0" input port, a voltage associated with a "1" being fed to the "1" input port, the bit-select output port of the switch control unit being connected to the bit-select input port of the bit-select switch, the bit-select switch connecting the "0" input port to the output port when the bit-select signal is in a "0"-select state, the bit-select switch connecting the "1" input port to the output port when the bit-select signal is in a "1"-select state;

a source-select switch having a bit-select switch input port, a bit-generator input port, a source-select input port, and an output port, the output port of the bit-select switch being connected to the bit-select switch input port, the source-select output port of the switch control unit being connected to the source-select input port, the source-select switch connecting the bit-select switch input port to the output port when the source-select signal is in a bit-select switch state, the output port of the source-select switch being the output port of the apparatus.

12. The apparatus of claim 11 wherein the switch control unit comprises:

an up-down counter, the count of the counter increasing or decreasing by 1 if the bit at the pseudorandom-bit input port is respectively a "1" or a "0" when a clock-signal transition in the predetermined direction occurs;

an arithmetic logic unit having a clock-signal input port, a first data input port, a second data input port, and a data output port, the clock signal feeding into the clock-signal input port, the count of the up-down counter feeding into the first data input port;

a register having a clock-signal input port, a data input port, a clear-data input port, and a data output port, the data output port of the arithmetic logic unit connecting to the data input port, the data output port of the register connecting to the second data input port of the arithmetic logic unit, the arithmetic logic unit making available at its data output port the sum of the register contents and the count of the up-down counter when a clock-signal transition in the predetermined direction occurs, a positive sum causing the bit-select signal to be in the "0"-select state, a negative sum causing the bit-select signal to be in the "1"-select state, the data at the data output port of the arithmetic logic unit being stored in the register when a clock-signal transition in the predetermined direction occurs, the source-select output port being connected to the clear-data input port, the register being cleared when the source-select signal is in the bit-select switch state.

13. The apparatus of claim 12 wherein the switch control unit further comprises:

an out-of-limits detector having a data input port and an output port, the data input port being connected to the data output port of the arithmetic logic unit, the output port of the out-of-limits detector being the source-select output port of the switch control unit, the out-of-limits detector causing the source-select signal to be in a bit-generator state if the data at the data input port is greater than a first value and less than a second value, the second value being greater than the first value; otherwise, the out-of-limits detector causing the source-select signal to be in the bit-select switch state.

14. The apparatus of claim 11 wherein means (b) comprises:

an initial pseudorandom bit sequence generator having a clock-signal input port, an operation-control port, and an output port, the output port of the clock being connected to the clock-signal input port, a clock-signal transition in a predetermined direction causing a new pseudorandom bit to appear at the output port when operation of the initial pseudorandom bit sequence generator is enabled, the output port of the initial pseudorandom bit sequence generator being connected to the bit-generator input port of the source-select switch, the source-select switch connecting the bit-generator input port to the output port when the source-select signal is in the bit-generator state, the source-select output port of the switch control unit being connected to the operation-control port of the initial pseudorandom bit sequence generator, operation of the initial pseudorandom bit sequence generator being enabled when the source-select signal is in the bit-generator state, operation of the pseudorandom bit generator being inhibited when the source-select signal is in the bit-select switch state.

15. The apparatus of claim 2 further comprising:

a light source;

a coil of optical fiber, the light produced by the light source being propagated through the optical fiber;

a modulator for modulating the light propagating through the optical fiber with the modified pseudorandom bit sequence;

a processor for determining the rotation of the coil from the light that has traveled through the optical fiber.

* * * * *